United States Patent
Stille

(10) Patent No.: US 9,025,553 B2
(45) Date of Patent: May 5, 2015

(54) CAPABILITY UPDATE IN A TELECOMMUNICATIONS NETWORK

(71) Applicant: Telefonaktiebolaget L M Ericsson (publ), Stockholm (SE)

(72) Inventor: Mats Stille, Bromma (SE)

(73) Assignee: Telefonaktiebolaget L M Ericsson (publ) (KR)

( * ) Notice: Subject to any disclaimer, the term of this patent is extended or adjusted under 35 U.S.C. 154(b) by 142 days.

(21) Appl. No.: 13/788,342

(22) Filed: Mar. 7, 2013

(65) Prior Publication Data

US 2013/0242942 A1    Sep. 19, 2013

(30) Foreign Application Priority Data

Mar. 12, 2012  (EP) ................................ 12159010

(51) Int. Cl.
| | |
|---|---|
| H04L 12/66 | (2006.01) |
| H04W 4/00 | (2009.01) |
| H04L 29/06 | (2006.01) |
| H04W 36/00 | (2009.01) |
| H04W 36/14 | (2009.01) |

(52) U.S. Cl.
CPC ........... H04L 65/1083 (2013.01); H04W 36/14 (2013.01); H04W 36/00 (2013.01); H04L 65/1016 (2013.01); H04L 65/1063 (2013.01); H04L 65/1006 (2013.01); H04W 36/0011 (2013.01)

(58) Field of Classification Search
None
See application file for complete search history.

(56) References Cited

U.S. PATENT DOCUMENTS

| | | | |
|---|---|---|---|
| 2010/0331055 A1* | 12/2010 | Lothrop et al. ............... | 455/567 |
| 2011/0058520 A1* | 3/2011 | Keller et al. .................. | 370/328 |
| 2011/0141947 A1* | 6/2011 | Li et al. .......................... | 370/259 |
| 2011/0231560 A1* | 9/2011 | Mahendran et al. .......... | 709/228 |
| 2012/0121212 A1* | 5/2012 | Decker et al. ................... | 383/33 |

(Continued)

FOREIGN PATENT DOCUMENTS

WO   WO 2009/130042 A2   10/2009

OTHER PUBLICATIONS

3GPP, Technical Specification—"$3^{rd}$ Generation Partnership Project; Technical Specification Group Services and System Aspects; Single Radio Voice Call Continuity (SRVCC) Stage 2 (Release 9)", TS 23.216, V9.9.0, Mar. 2012, 43 pp.

(Continued)

*Primary Examiner* — Phuc Tran
*Assistant Examiner* — Soon-Dong D Hyun
(74) *Attorney, Agent, or Firm* — Myers Bigel Sibley & Sajovec, P.A.

(57) ABSTRACT

An apparatus configured to operate as a Service Centralization and Continuity Application Server (SCC-AS) within an IP Multimedia Subsystem network, the apparatus comprises a receiver for receiving a SIP INVITE originating from or sent via an access domain and for determining that the INVITE relates to a handover of a User Equipment (UE) currently served by the SCC-AS, to that access domain and for which a session with a peer UE is ongoing and the apparatus further comprises a message handler for determining if capabilities for the ongoing session, identified within said INVITE, have changed with respect to capabilities previously associated with the ongoing session and, if it is determined that capabilities have changed, for causing a SIP message to be sent to said peer UE, the message containing the changed capabilities.

21 Claims, 5 Drawing Sheets

(56) References Cited

U.S. PATENT DOCUMENTS

| | | | |
|---|---|---|---|
| 2012/0263171 A1* | 10/2012 | Long et al. | 370/352 |
| 2013/0242775 A1* | 9/2013 | Taylor | 370/252 |
| 2013/0322312 A1* | 12/2013 | Kim et al. | 370/310 |

OTHER PUBLICATIONS

3GPP, Technical Specification—"3$^{rd}$ Generation Partnership Project; Technical Specification Group Services and System Aspects; IP Multimedia Subsystem (IMS) Service Continuity; Stage 2 (Release 10)", TS 23.237, V10.4.0, Dec. 2010, 154 pp.

3GPP, Technical Specification—"3$^{rd}$ Generation Partnership Project; Technical Specification Group Services and System Aspects; Circuit Switched (CS) fallback in Evolved Packet System (EPS); Stage 2 (Release 10)", TS 23.272, V10.9.0, Dec. 2010, 84 pp.

3GPP, Technical Specification—"3$^{rd}$ Generation Partnership Project; Technical Specification Group Services and System Aspects; IP Multimedia Subsystem (IMS) centralized services; Stage 2 (Release 10)", TS 23.292, V10.5.0, Mar. 2012, 110 pp.

3GPP, Technical Specification—"3$^{rd}$ Generation Partnership Project; Technical Specification Group Core Network and Terminals; IMS multimedia telephony communication service and supplementary services; Stage 3 (Release 10)", TS 24.173, V10.0.0, Sep. 2010, 16 pp.

3GPP, Technical Specification—"3$^{rd}$ Generation Partnership Project; Technical Specification Group Core Network and Terminals; IP multimedia call control protocol based on Session Initiation Protocol (SIP) and Session Description Protocol (SDP); Stage 3 (Release 10)", TS 24.229, V10.11.0, Mar. 2013, 711 pp.

European Search Report, Application No. EP 12 15 9010, Jul. 18, 2012.

Apple Inc.: "iPhone User Guide for iOS 5.1 Software", Mar. 7, 2012, retrieved from the Internet Jun. 21, 2012: URL:http://manuals.info.apple.com/en_US/iphone_user_guide.pdf, XP002678304, pp. 12-13, 163-164.

M. Handley et al. "SDP: Session Description Protocol" Network Working Group, Request for Comments: 4566, Obsoletes: 2327, 3266, Category: Standards Track, pp. 1-49, Jul. 2006.

* cited by examiner

CAPABILITY UPDATE IN A TELECOMMUNICATIONS NETWORK

CROSS-REFERENCE TO RELATED APPLICATION

The present application claims priority to European Patent Application No. EP12159010.3, filed Mar. 12, 2012, the disclosure of which is incorporated herein as if set forth fully herein.

TECHNICAL FIELD

The present invention relates to providing user terminals with capability updates, and more particularly to providing such updates following handovers of terminals between different radio access technologies.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP), Existing cellular network deployments are dominated by the 2G and 3G standards. The process of rolling out so-called 4G networks has just begun, and it will be many years before 4G network coverage is sufficient to allow 2G and 3G networks to be withdrawn completely. A fundamental requirement for real-time service provision is the seamless handover of services for subscribers moving across cell boundaries of the radio access network (RAN). Given the ongoing co-existence of 2G, 3G and 4G networks, it is particularly desirable to allow for the handover of real-time service connections such as voice calls between the different radio access technologies.

Considering further the 4G technology, this is being specified under the name LTE (Long Term Evolution) and SAE (System Architecture Evolution) in 3GPP. The LTE radio access network technology implements only a packet switched access, in contrast to 2G and 3G (using GERAN and UTRAN radio access network technologies respectively) which provide for both packet switched and circuit switched access. In 2G and 3G networks, packet switched connections are used to carry data whilst circuit switched connections are used for real-time services such as voice calls. In 4G networks, all services will be carried via packet switched connections. In the case of a voice call initiated when a user is attached to a LTE radio access network (termed Enhanced UTRAN or E-UTRAN), that call will of course make use of a packet switched connection. If it is necessary for the call to be transferred to a 2G or 3G radio access network, e.g. because the user moves out of the coverage area of the E-UTRAN and into that of a GERAN or UTRAN network, the call must be switched from a packet switched (PS) access to a circuit switched (CS) access. Of course, the process for implementing the handover must be seamless such that little or no disruption of the call is perceived by the user. An appropriate access handover mechanism is also required in the case of the handover of a call from a PS access using a 3G UTRAN (HSPA) access network to a CS call using either 3G UTRAN access or 2G GSM access.

FIG. 1 illustrates schematically a scenario in which a user terminal (or User Equipment, UE, according to 3G terminology) initiates a voice call using a LTE radio access network and is subsequently handed over to a GSM/Edge Radio Access Network (GERAN). The call is established using the IMS network described above and which provides a common service control network for the PS and CS domains provided through the LTE, UTRAN, or GERAN radio accesses. In particular, the IMS includes a Multimedia Telephony (MMTel) Application Server which implements service logic for establishing and controlling voice calls. In order to implement the access handover, media control must be transferred from the Evolved Packet Core (EPC) network of the 4G domain to an allocated Mobile Switching Centre (MSC) within the 2G/3G domain. Other components illustrated in FIG. 1 are a Mobile Switching Centre Server (MSS) which has support for the GSM access network, an enhanced Node B (eNodeB) which provides inter alia control of radio access within the LTE RAN, a Serving/PDN gateway (S/P-GW), a Mobility Management Entity (MME) (both the S/P-GW and the MME reside within the EPC), and a Home Subscriber Server that resides within a subscriber's home network.

The SGW sits in the user plane where it forwards and routes packets to and from the eNodeB and the PDN GW. The S/P-GW also serves as the local mobility anchor for inter-eNodeB handovers and roaming between two 3GPP systems. The PDN GW (not shown in FIG. 1) acts as the interface between the radio network and the Packet Data Networks (PDNs), such as the Internet or SIP-based IP Multimedia Subsystem (IMS) networks (fixed and mobile). The PDN GW is the mobility anchor point for intra-3GPP access system mobility and for mobility between 3GPP access systems and non-3GPP access systems.

Interworking solutions for IMS Centralized Services (ICS) as specified in 3GPP TS 23.292, "IP Multimedia Subsystem (IMS) centralized services; Stage 2", allows IMS sessions using CS bearers to be treated as standard IMS sessions, which is required for the purpose of IMS Service Continuity. ICS defines signalling mechanisms between the UE and IMS for transport of information to centralise the service in the IMS, and TS 23.237 "IP Multimedia Subsystem (IMS) Service Continuity" defines the additional procedures needed for service continuity when using CS access for media transport. Within the context of TS 23.292 and TS 23.237, the further 3GPP document TS 23.216: "Single Radio Voice Call Continuity (SRVCC); Stage 2", describes a mechanism for handing over a voice call from a PS to a CS access. With reference to FIG. 1, this relies upon ICS and Service Continuity functionality that is implemented in the Service Centralisation and Continuity Application Server (SCC AS) within the IMS (shown co-located with the MMTel AS in FIG. 1). Whilst effective, the mechanism described in TS 23.216 (identified as Rel-9) involves a relatively long path for handover control signalling given that the SCC AS is located in a user's home network and the signalling may have to pass through an IMS network associated with a visited network (in the case of a roaming subscriber where the serving network is not the home network). Handovers may be delayed as a result, possibly giving rise to interruptions in voice calls. SRVCC is applicable to handover to a CS access from a PS access where that PS access is provided by either of a LTE access or a UTRAN (HSPA) access.

It has been recognised that such a long path for access handover related signalling is undesirable. This problem is addressed in TS 23.237, "IP Multimedia Subsystem (IMS) Service Continuity", which proposes introducing the architecture illustrated in FIG. 2. An Access Transfer Control Function (ATCF) is included in the serving (e.g. visited) IMS network. This approach is referred to as Rel-10. According to Rel-10, the ATCF acts as a media gateway controller for an Access Transfer Gateway (ATGW) that is also present in the serving IMS network. The ATGW acts as an anchor for the IMS media traffic to allow media traffic to be switched quickly from the PS access network to the CS access network via the MSC. Additional functions of IMS Service Continuity are provided by the ATCF/ATGW in the serving (visited if roaming) network. In particular, responsibility for managing radio access handovers is delegated from the SCC AS to the ATGW. Within the CS core network, a SRVCC function is introduced into one of the network MSCs. This may or may not be the same MSC as the Target MSC for the handover.

When the UE performs IMS registration, a decision is made (by the P-CSCF) as to whether or not to include the ATCF in the path. If the ATCF is included, the ATCF reports a Session Transfer Number Single Radio (STN-SR) to the SCC AS in the home IMS network. This STN-SR is recorded by the SCC-AS in the HSS in respect of the ongoing IMS session. The STN-SR points uniquely to the ATCF. When the UE is either initiating or receiving an incoming call, the ATCF makes a decision concerning whether or not to anchor the media in the controlled ATGW. If the media is anchored at the ATGW, then, when an access handover takes place, the redirection of media to the new access will be carried out locally in the serving (e.g. visited) network. The anchored media in the ATGW is redirected to the CS side instead of the PS side.

According to the LTE architecture described with reference to FIG. 2, a VoLTE call is anchored in an ATFC/ATGW function residing between the P-CSCF and the S-CSCF of the served user. In the event of a handover of a UE served by the ATCF, there is no requirement to inform the remote end beyond the SCC-AS point that handover has taken place (in order to shorten voice interruption time), especially as the type of communication, i.e. voice, has not changed. A problem will arise however in the event that handover results in a change to the session capabilities.

The architecture described may result in the remote end (UE) of the VoLTE session remaining under the impression that voice session add-on services are still possible despite this no longer being the case as a result of the handover from PS to CS access. For example if an add-video capability was exchanged during the voice establishment phase—as it may be according to GSMA PRD IR.94—the remote end UE might continue to have a 'switch-to-video' or 'video upgrade' icon highlighted in its call window after handover. If the remote end-user selects switch-to-video, that attempt will fail due to the inability of the CS call leg to support video.

SUMMARY

It is an object of the present invention to provide a mechanism that allows UEs to be informed promptly of any changes to session capabilities following a handover between access domains, e.g. PS to CS or CS to PS.

According to a first aspect of the present invention there is provided apparatus configured to operate as a Service Centralization and Continuity Application Server, SCC-AS, within an IP Multimedia Subsystem network. The apparatus comprises a receiver for receiving a SIP INVITE originating from or sent via an access domain and for determining that the INVITE relates to a handover of a User Equipment, UE, currently served by the SCC-AS, to that access domain and for which a session with a peer UE is ongoing. The apparatus further comprises a message handler for determining if capabilities for the ongoing session, identified within said INVITE, have changed with respect to capabilities previously associated with the ongoing session and, if it is determined that capabilities have changed, for causing a SIP message to be sent to said peer UE, the message containing the changed capabilities.

According to a second aspect of the present invention there is provided User Equipment, UE, configured for use with a mobile communication system offering IP Multimedia Subsystem, IMS, services. The UE comprises an IMS client for establishing and controlling a session with a peer UE via the mobile communication system, the client being configured to receive from the system a SIP message relating to the ongoing session, to determine from a Contact header of the received message if the capabilities associated with the ongoing session have changed with respect to previously negotiated capabilities, and, if the capabilities have changed, for updating a user interface of the UE to reflect the changed capabilities.

According to a third aspect of the present invention there is provided method of notifying a first User Equipment, UE, of changes to capabilities associated with an IP Multimedia Subsystem enabled session involving the first UE and a second UE. The method comprises, following a handover of said second UE from a first to a second access domain, sending from that second access domain to a Service Centralization and Continuity Application Server, SCC-AS, within the second UE's home IMS network, a SIP INVITE including updated session capabilities for the ongoing session. The method further comprises receiving the SIP INVITE at said SCC-AS and generating a SIP message containing the changed capabilities, sending said SIP message to the first UE, and receiving the SIP message at the first UE, identifying the changed capabilities, and updating a user interface of the first UE to reflect the changed capabilities.

DETAILED DESCRIPTION

As has been discussed above, the 3GPP Single Radio Voice Call Continuity (SRVCC) mechanism provides for the handover of a voice call from a Packet Switched (PS) access to a Circuit Switched (CS) access, whilst the enhancements introduced in Rel-10 provide for an optimised access handover procedure by delegating certain responsibilities from the SCC-AS in a subscriber's home network to an ATCF in a serving (e.g. visited) network. Problems may arise as a result of a remote end UE being unaware of a handover procedure.

In order to avoid this problem, it is proposed here to introduce a mechanism whereby, when the SCC-AS receives an INVITE originating from the MSC after handover, via the ATCF (see GSMA PRD IR.64 or 3GPP TS 23.272 release 10), the SCC-AS checks the INVITE Contact header to determine if the capabilities have been changed compared to the (original) capabilities signalled at initial call establishment. [Note that if the INVITE contains no capabilities at all, and the original call capabilities indicated IP voice, for example by 'MMTel', this can be regarded as the capabilities being unchanged.] If it is determined that the capabilities have changed, the SCC-AS sends a re-INVITE or SIP UPDATE with a Contact header containing the current capabilities, e.g. 'MMtel', to the remote end device. Upon reception of the SIP re-INVITE or UPDATE, the remote end UE may remove or grey-out any video related icon, e.g. 'switch-to-video' or 'video upgrade', in order to avoid an end-user "trial and error" experience.

Figure 1:
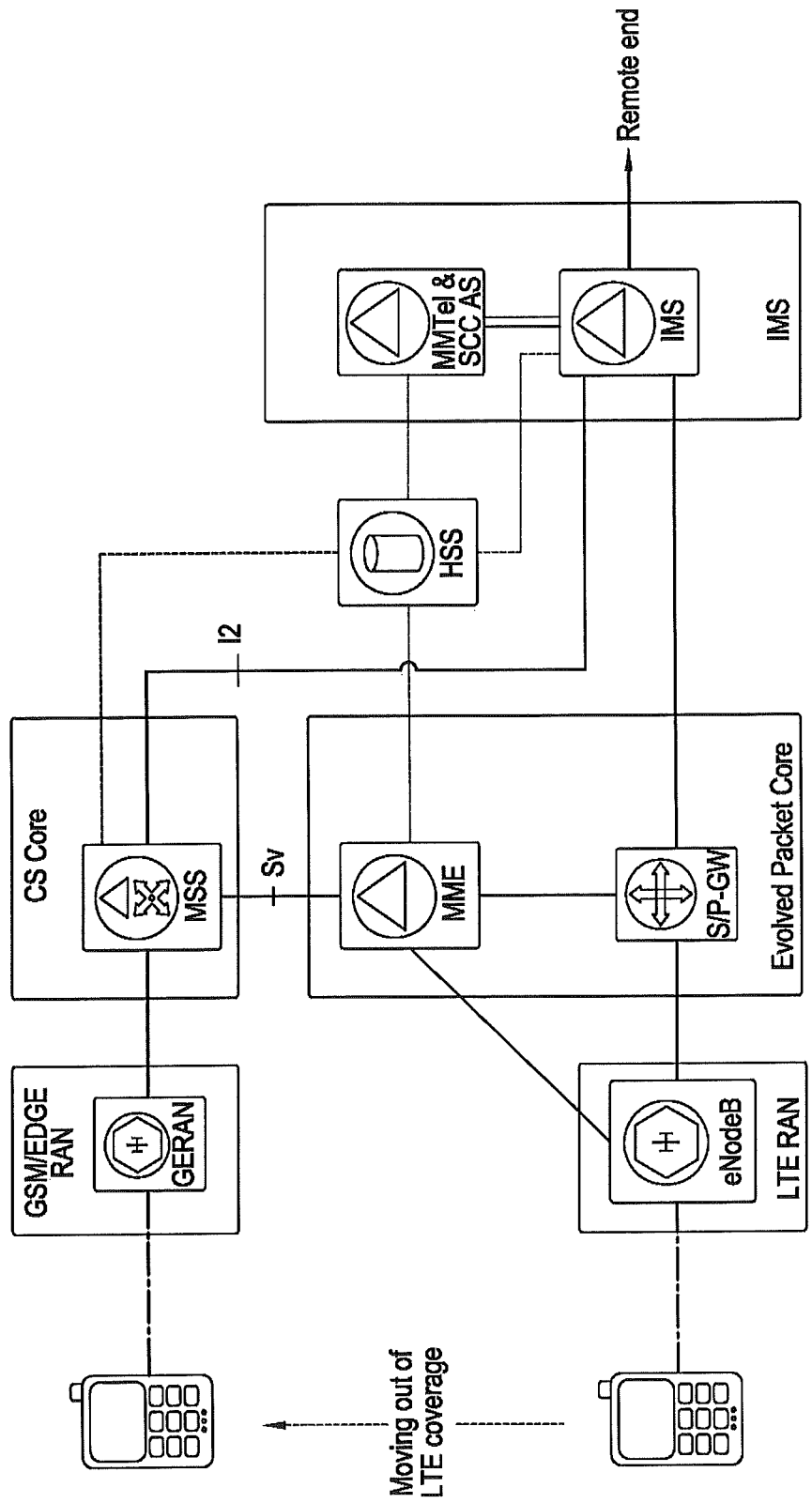
FIG. 1 illustrates schematically a prior art architecture for managing PS to CS handover of voice calls according to 3GPP Rel-9.
Figure 2:
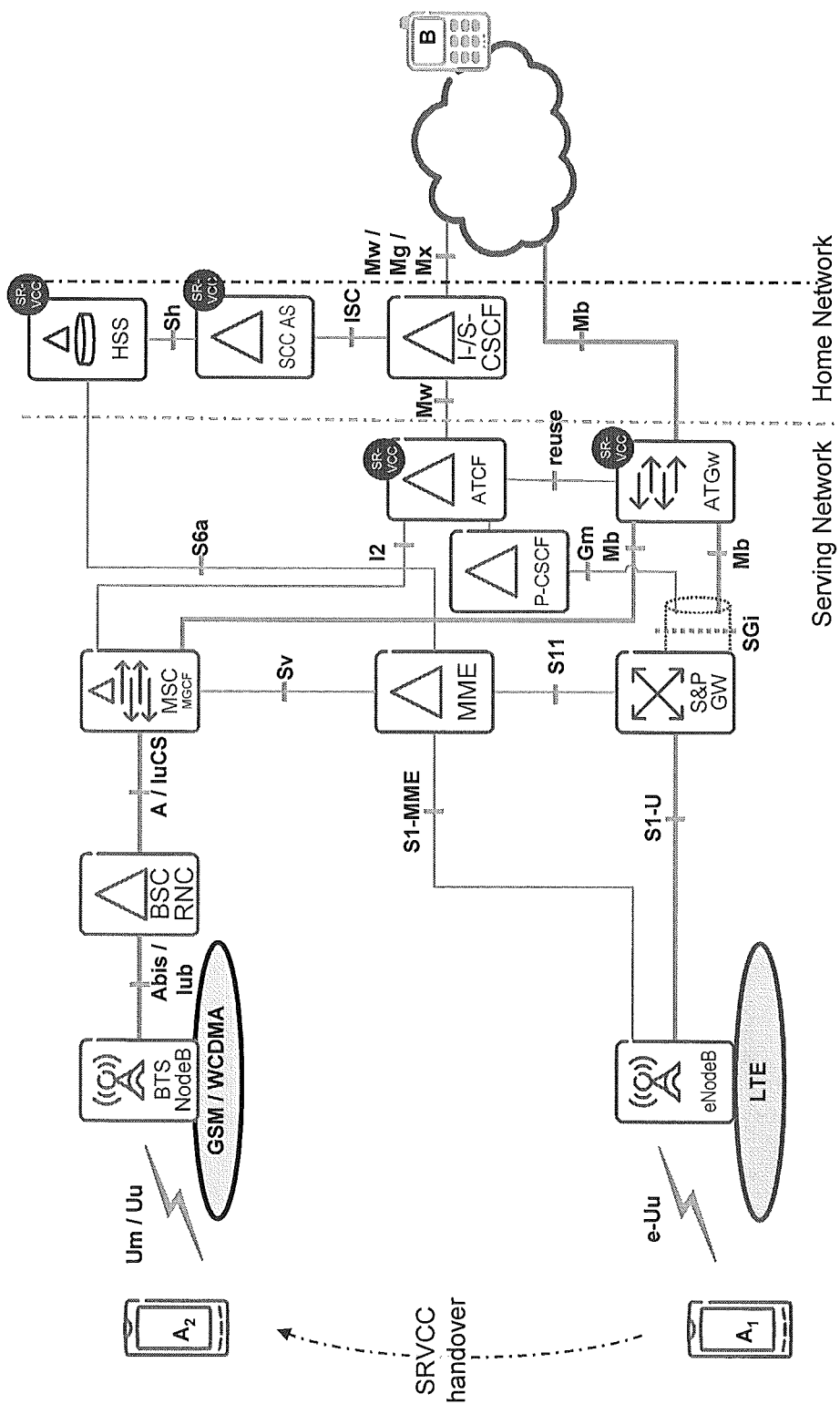
FIG. 2 illustrates schematically a prior art architecture for managing PS to CS handover of voice calls according to 3GPP Rel-10.

Referring to the Rel-10 architecture of FIG. 2, the aforementioned INVITE, resulting from the CS-handover, is sent from the MSC over the I2 (or Mg) interface, via the ATCF and the CSCF, to the SCC-AS which informs the remote end network/UE-B about any new capability in case capabilities have changed compared with the capabilities signalled prior to handover.

Figure 3:
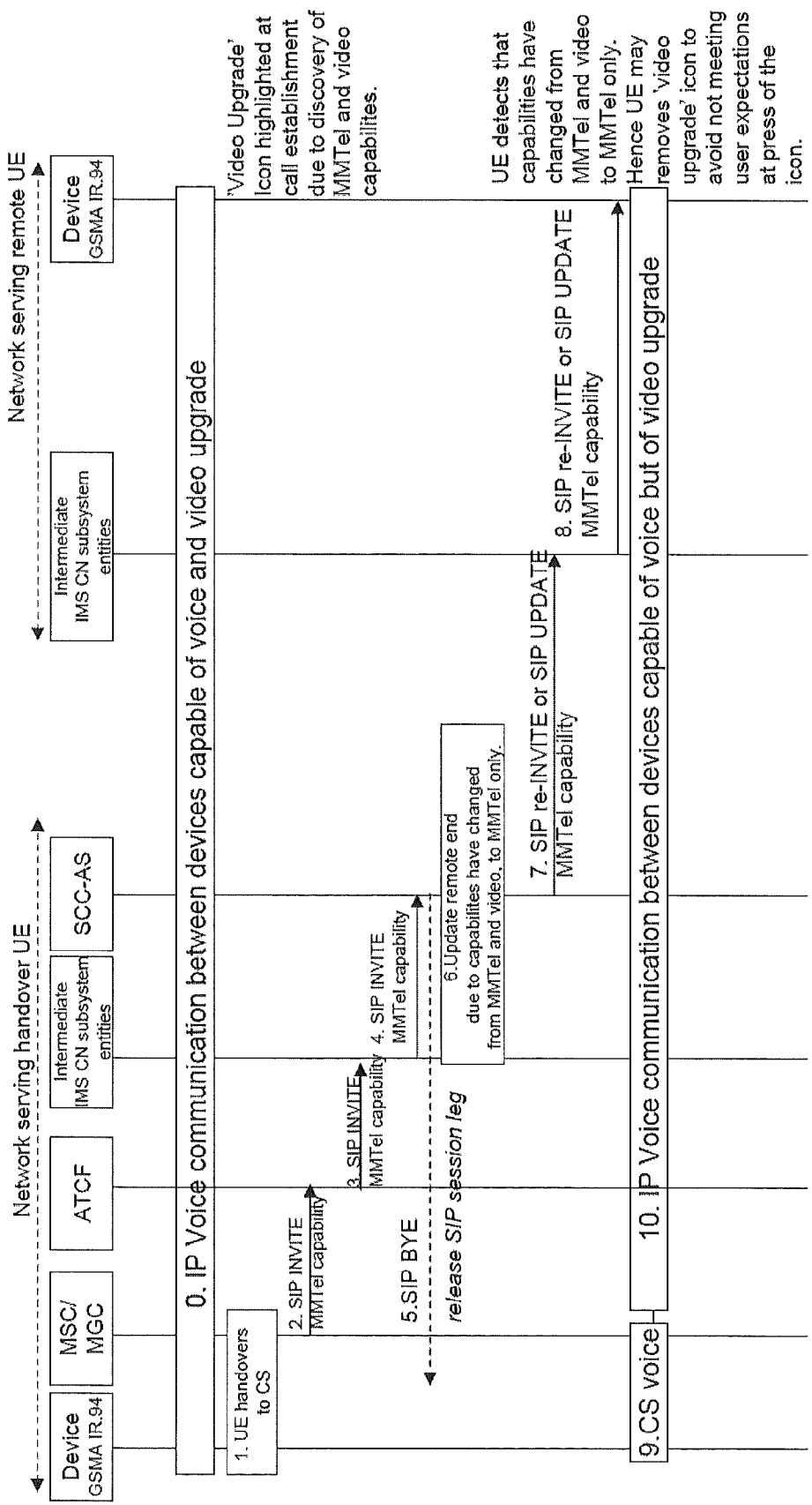
FIG. 3 illustrates a capability update procedure in the network architecture of FIG. 2, following a handover.

FIG. 3 illustrates further the general signalling flow associated with this solution (certain signalling is omitted for simplicity). At step 0, an IP voice communication is established between a pair of UEs. At step 1, for example as a result of one of the users moving out of the LTE coverage area of a network operator, one of the UEs is handed over to a CS access domain. Intrinsic to the known handover procedure is that the responsible MSC in the CS access domain will send a SIP INVITE, step 2, to the IMS network. This INVITE is addressed to the ATCF. As is also a requirement of the existing procedures, the ATCF will send a further INVITE, steps 3 and 4, to the SCC-AS. The INVITE will include the Contact header containing the well-known MMTel service identifier as of 3GPP TS 24.173 in the ICSI feature tag (see 3GPP TS 24.229). At this point the SCC-AS may either release the SIP session with the mobile, step 5, or retain that session (e.g. in case the UE wishes to maintain the PS session for the purpose of controlling the CS call). The process up to and including step 5 is standard in the Rel__10 IMS architecture. Steps 6 to 8 illustrated in FIG. 3 are new, and involve the SCC-AS determining that call capabilities have changed, and signalling these to the remote UE, via that UE's IMS CN subsystem, using either a SIP re-INVITE or a SIP UPDATE. The receiving UE extracts the capabilities in the Contact header and if, for example, it discovers that there is no longer a video capability, the UE may decide to grey out/remove any video related symbol from the device display. Steps 9 and 10 illustrated in FIG. 3 relate to continuation of the voice session between the two UEs.

Figure 4:
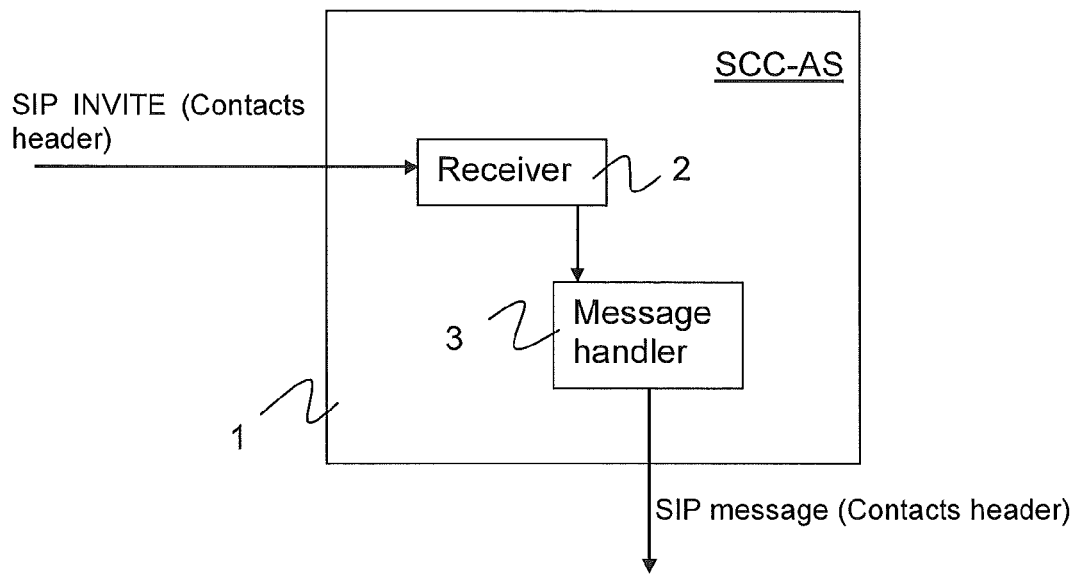
FIG. 4 illustrates schematically a SCC-AS node for use within an IMS network.

FIG. 4 illustrates schematically apparatus 1 configured to operate within an IMS network as a SCC-AS. The apparatus comprises a receiver 2 for receiving a SIP INVITE originating from a visited mobile network (PLMN) and for determining that the INVITE relates to a handover of a User Equipment, UE, currently served by the SCC-AS, to that visited mobile network and for which a session with a peer UE is ongoing. It further comprises a message handler for determining if capabilities for the ongoing session, identified within said INVITE, have changed with respect to capabilities previously associated with the ongoing session. If it is determined that capabilities have changed, the message handler 3 causes a SIP message to be sent to the peer UE, the message containing the changed capabilities.

Figure 5:
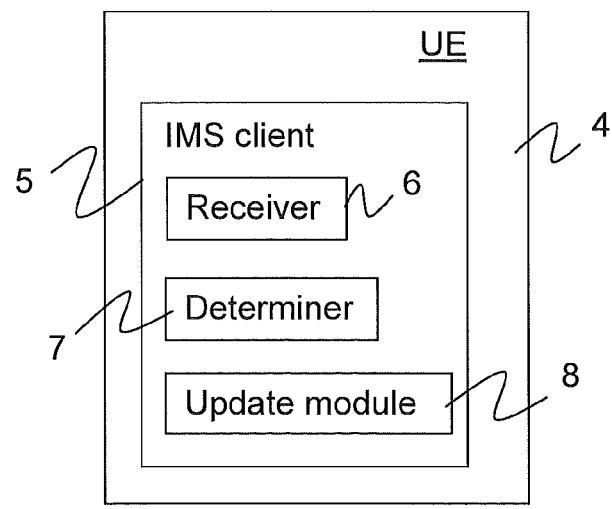
FIG. 5 illustrates schematically a User Equipment configured to a handle in-session capability signalling.

FIG. 5 illustrates schematically a User Equipment UE 4 which includes, amongst certain "standard" UE functionality, an IMS client 5. This IMS client is responsible for establishing and controlling a session with a peer UE via the mobile communication system. The IMS client 5 includes a receiver 6 for receiving from the system a SIP message relating to the ongoing session, and a determiner 7 for determining from a Contact header of the received message if the capabilities associated with the ongoing session have changed with respect to previously negotiated capabilities. The client 5 further comprises an updating module 8 configured, if the capabilities have changed, to update a user interface of the UE to reflect the changed capabilities.

Figure 6:
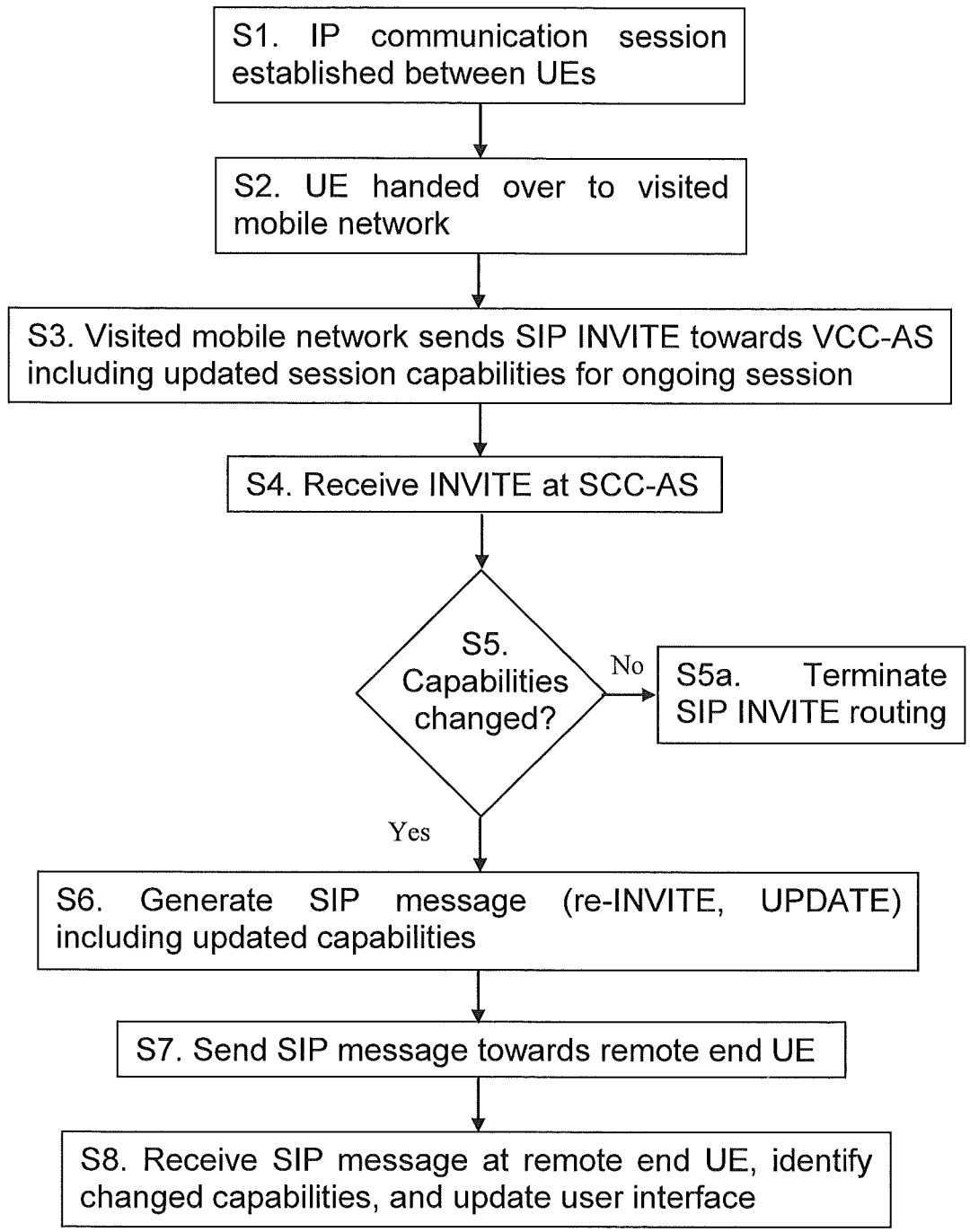
FIG. 6 is a flow diagram illustrating a method of updating session capabilities following handover of a session.

FIG. 6 is a flow diagram further illustrating a method of updating capabilities associated with an ongoing IMS enabled session, so that these capabilities are known to the session participants. The following steps are illustrated in the Figure:

S1. An IP session (e.g. voice) is established between the parties (UEs).

S2. At some point during the session, one of the UEs is handed over to a further visited mobile network.

S3. Upon completion of the handover, the further visited mobile network (MSC/MGC) sends a SIP INVITE, via the ATCF and intermediate IMS core network nodes, towards the SCC-AS currently serving the handed over UE. This INVITE includes the updated capabilities for the session.

S4. The INVITE is received at the SCC-AS.

S5. The SCC-AS determines whether or not the capabilities have changed.

S5a. If the capabilities have not changed, the SCC-AS terminates the routing of the INVITE.

S6. If the capabilities have changed, the SCC-AS generates one of a SIP re-INVITE or UPDATE, including in the message the updated capabilities.

S7. The SIP messages is sent by the SCC-AS towards the peer, remote end UE.

S8. The remote end UE receives the SIP message (from the SCC-AS), identifies any changed capabilities, and, in dependence upon the changed capabilities, updates the user interface and/or otherwise alerts the user.

It will be appreciated by the skilled person that various modifications may be made to the above described embodiments without departing from the scope of the present invention. For example, it will be appreciated that, as an alternative to the SIP re-INVITE and SIP UPDATE messages, other SIP messages may be used to signal the handover to the remote UE. Examples include the SIP INFO and SIP OPTIONS messages. It will also be appreciated that, whilst the embodiment described above is concerned with handover from a LTE to a CS network, the invention may be applied to other (mobile) access domain handover scenarios including the reverse handover scenario, i.e. from a CS to a LTE network. In that particular case, the INVITE sent to the ATCF and relayed to the SCC-AS will originate from the UE that is being handed over (rather than from the MSC in the CS network).

The invention claimed is:

1. Apparatus configured to operate as a Service Centralization and Continuity Application Server (SCC-AS) within an IP Multimedia Subsystem network, the apparatus comprising:
   a receiver configured to receive a SIP INVITE originating from or sent via an access domain and configured to determine that the INVITE relates to a handover of a User Equipment, UE, currently served by the SCC-AS, to that access domain and for which a session with a peer UE is ongoing; and
   a message handler configured to determine if capabilities for the ongoing session, identified within said INVITE, have changed with respect to capabilities previously associated with the ongoing session and, in response to determining that the capabilities have changed, to cause a SIP message to be sent to said peer UE, the message containing the changed capabilities.

2. Apparatus according to claim 1, wherein said message handler is configured to cause one of a SIP re-INVITE, SIP UPDATE, SIP INFO and SIP OPTIONS, containing the changed capabilities, to be sent to said peer UE.

3. Apparatus according to claim 2, wherein the capabilities are included within a Contacts header of said INVITE, and said message handler is configured to copy the Contacts header into the SIP message to be sent to the peer UE in response to determining that the capabilities have changed.

4. Apparatus according to any claim 3, wherein the ongoing session is a voice call and the message handler is configured to determine if a video capability for the session has changed as a result of the handover.

5. Apparatus according to claim 1, wherein the capabilities are included within a Contacts header of said INVITE, and said message handler is configured to copy the Contacts header into the SIP message to be sent to the peer UE in response to determining that the capabilities have changed.

6. Apparatus according to claim 1, wherein the ongoing session is a voice call and the message handler is configured to determine if a video capability for the session has changed as a result of the handover.

7. The apparatus according to claim 1, wherein the changed capabilities reflect a change of a video capability of the ongoing session.

8. A User Equipment (UE) configured for use with a mobile communication system offering IP Multimedia Subsystem (IMS) services, the UE comprising:
   an IMS client configured to establish and control a session with a peer UE via the mobile communication system, the client being configured to receive from the system a SIP message relating to the ongoing session, to determine from a Contact header of the received message if the capabilities associated with the ongoing session have changed with respect to previously negotiated capabilities, and, in response to the capabilities having changed, to update a user interface of the UE to reflect the changed capabilities.

9. The User Equipment of claim 8, wherein updating the user interface comprises updating the user interface to reflect a change of a video capability of the ongoing session.

10. A method of notifying a first User Equipment (UE) of changes to capabilities associated with an IP Multimedia Subsystem enabled session involving the first UE and a second UE, the method comprising:
    following a handover of said second UE from a first to a second access domain, sending from that second access domain to a Service Centralization and Continuity Application Server (SCC-AS) within the second UE's home IMS network, a SIP INVITE including updated session capabilities for the ongoing session;
    receiving the SIP INVITE at said SCC-AS and generating a SIP message containing the changed capabilities;
    sending said SIP message to the first UE; and
    receiving the SIP message at the first UE, identifying the changed capabilities, and updating a user interface of the first UE to reflect the changed capabilities.

11. A method according to claim 10, wherein the generated message is a SIP re-INVITE, SIP UPDATE, SIP INFO or SIP OPTIONS.

12. A method according to claim 11,
    wherein said changed capabilities are included within a Contacts header of the SIP INVITE,
    the method further comprising copying the Contacts header into the SIP message generated at the SCC-AS.

13. A method according to claim 10,
    wherein said changed capabilities are included within a Contacts header of the SIP INVITE,
    the method further comprising copying the Contacts header into the SIP message generated at the SCC-AS.

14. A method according to claim 10, wherein the ongoing session is a voice call and the message handler is configured to determine if a video capability for the session has changed as a result of the handover.

15. The User Equipment of claim 8, wherein updating the user interface of the UE comprises changing a display of an icon of the user interface to reflect the changed capabilities.

16. The User Equipment of claim 15, wherein updating the user interface of the UE comprises graying out or removing the icon of the user interface to reflect the changed capabilities.

17. The User Equipment of claim 16, wherein the icon represents a function to switch the ongoing session to video.

18. The method according to claim 10, wherein updating the user interface of the first UE comprises changing a display of an icon of the user interface to reflect the changed capabilities.

19. The method according to claim 18, wherein updating the user interface of the first UE comprises graying out or removing the icon of the user interface to reflect the changed capabilities.

20. The method according to claim 19, wherein the icon represents a function to switch the ongoing session to video.

21. The User Equipment of claim 10, wherein updating the user interface comprises updating the user interface to reflect a change of a video capability of the ongoing session.

* * * * *